United States Patent
Melton

(10) Patent No.: US 8,099,783 B2
(45) Date of Patent: Jan. 17, 2012

(54) SECURITY METHOD FOR DATA PROTECTION

(75) Inventor: Randall W. Melton, Olney, MD (US)

(73) Assignee: Atmel Corporation, San Jose, CA (US)

( * ) Notice: Subject to any disclaimer, the term of this patent is extended or adjusted under 35 U.S.C. 154(b) by 960 days.

(21) Appl. No.: 11/340,975

(22) Filed: Jan. 27, 2006

(65) Prior Publication Data

US 2006/0250239 A1 Nov. 9, 2006

Related U.S. Application Data

(60) Provisional application No. 60/678,446, filed on May 6, 2005.

(51) Int. Cl.
*G08B 23/00* (2006.01)
(52) U.S. Cl. ............. 726/23; 726/34; 702/117; 713/194
(58) Field of Classification Search .................. 713/168
See application file for complete search history.

(56) References Cited

U.S. PATENT DOCUMENTS

| | | | |
|---|---|---|---|
| 3,447,120 A * | 5/1969 | Rask et al. ................ | 439/497 |
| 3,772,595 A * | 11/1973 | De Wolf et al. ............ | 714/736 |
| 4,593,384 A | 6/1986 | Kleijne ..................... | 365/228 |
| 4,684,931 A | 8/1987 | Parks | |
| 4,691,350 A | 9/1987 | Kleijne et al. ............ | 713/194 |
| 4,807,284 A | 2/1989 | Kleijne ..................... | 380/3 |
| 4,833,096 A | 5/1989 | Huang et al. | |
| 5,021,848 A | 6/1991 | Chiu | |
| 5,262,985 A | 11/1993 | Wada | |
| 5,406,630 A | 4/1995 | Piosenka .................. | 380/52 |
| 5,420,379 A | 5/1995 | Zank et al. | |
| 5,477,068 A | 12/1995 | Ozawa | |
| 5,479,368 A | 12/1995 | Keshtbod | |
| 5,618,742 A | 4/1997 | Shone et al. | |
| 5,635,862 A | 6/1997 | Abramson et al. | |
| 5,642,061 A | 6/1997 | Gorney | |

(Continued)

FOREIGN PATENT DOCUMENTS

CN 1292110 4/2001

(Continued)

OTHER PUBLICATIONS

Auhtor Unkown, Logic Gates, Apr. 12, 2000, Copyright Adrian Als 1999.*

(Continued)

*Primary Examiner* — Edan Orgad
*Assistant Examiner* — Brian Olion
(74) *Attorney, Agent, or Firm* — Fish & Richardson P.C.

(57) ABSTRACT

An integrated circuit (IC) security apparatus with complementary security traces and a method for producing such an apparatus is disclosed. The security apparatus comprises a pattern generator, and a plurality of security traces. The arrangement of security trace pairs are such that the second trace is arranged substantially parallel to the first trace. The pattern generator produces two signals, a second signal, which is applied to the second trace, is substantially complimentary to the first security trace. The timing and amplitude of the second (complimentary) signal is developed such that any net induced currents are substantially nulled. One or more of the signals is received from the signal generator and compared to the same signal after it is conducted through a security trace. The results are analyzed to determine if the security of the IC has been breached.

18 Claims, 2 Drawing Sheets

U.S. PATENT DOCUMENTS

| | | | |
|---|---|---|---|
| 5,675,319 A * | 10/1997 | Rivenberg et al. | 340/550 |
| 5,687,113 A | 11/1997 | Papadas et al. | |
| 5,760,435 A | 6/1998 | Pan | |
| 5,776,787 A | 7/1998 | Keshtbod | |
| 5,786,612 A | 7/1998 | Otani et al. | |
| 5,789,297 A | 8/1998 | Wang et al. | |
| 5,963,806 A | 10/1999 | Sung et al. | |
| 5,972,752 A | 10/1999 | Hong | |
| 6,043,530 A | 3/2000 | Chang | |
| 6,074,914 A | 6/2000 | Ogura | |
| 6,091,101 A | 7/2000 | Wang | |
| 6,178,113 B1 | 1/2001 | Gonzalez et al. | |
| 6,246,970 B1 * | 6/2001 | Silverbrook et al. | 702/117 |
| 6,255,689 B1 | 7/2001 | Lee | |
| 6,255,691 B1 | 7/2001 | Hashimoto | |
| 6,323,088 B1 | 11/2001 | Gonzalez et al. | |
| 6,327,678 B1 * | 12/2001 | Nagai | 714/700 |
| 6,346,822 B2 | 2/2002 | Nishikawa | |
| 6,396,400 B1 | 5/2002 | Epstein, III et al. | 340/550 |
| 6,479,351 B1 | 11/2002 | Lojek et al. | |
| 6,496,119 B1 | 12/2002 | Otterstedt et al. | |
| 6,531,735 B1 | 3/2003 | Kamigaki et al. | |
| 6,646,565 B1 | 11/2003 | Fu et al. | 340/687 |
| 6,774,790 B1 | 8/2004 | Houston | |
| 6,831,325 B2 | 12/2004 | Lojek | |
| 6,879,518 B1 | 4/2005 | Curry | 365/185.04 |
| 6,919,242 B2 | 7/2005 | Lojek | |
| 7,057,235 B2 | 6/2006 | Lojek | |
| 7,098,106 B2 | 8/2006 | Lojek | |
| 7,352,203 B1 | 4/2008 | Ziomek | |
| 7,622,944 B2 | 11/2009 | Ziomek | |
| 2002/0167075 A1 * | 11/2002 | Madrid | 257/666 |
| 2003/0013255 A1 | 1/2003 | Lojek et al. | |
| 2003/0042970 A1 | 3/2003 | Humphrey | |
| 2004/0032304 A1 | 2/2004 | Anthony et al. | |
| 2004/0268136 A1 | 12/2004 | Mitsuishi | |
| 2005/0223152 A1 | 10/2005 | Sugaware | |
| 2007/0040256 A1 | 2/2007 | Tuyls et al. | |
| 2007/0134875 A1 | 6/2007 | Lojek | |
| 2008/0150574 A1 | 6/2008 | Ziomek | |

FOREIGN PATENT DOCUMENTS

| | | |
|---|---|---|
| CN | 1358059 | 7/2002 |
| JP | 58-209136 A | 12/1983 |
| JP | 5-167020 A | 7/1993 |
| JP | 2001-166009 A | 6/2001 |
| JP | 2001-177064 A | 6/2001 |
| JP | 2001-244414 A | 9/2001 |
| WO | WO-2005/022635 A1 | 3/2005 |
| WO | WO-2006/121554 A2 | 11/2006 |
| WO | WO-2006121554(A3) | 11/2006 |
| WO | WO-2008082989 A1 | 7/2008 |

OTHER PUBLICATIONS

Texas Instruments, 74LS22, 1998, pp. 1-7.*
"Chinese Application Serial No. 200680015496.3 , First Office Action mailed Feb. 27, 2009", (w/ English Translation), 18 pgs.
"International Application Serial No. PCT/US06/13244, International Preliminary Report on Patentability mailed May 15, 2008", 5 pgs.
"International Application Serial No. PCT/US06/13244, International Search Report mailed Jul. 2, 2007", 1 pg.
"International Application Serial No. PCT/US06/13244, Written Opinion mailed Jul. 2, 2007", 3 pgs.
"Application Serial No. 092135932, Search Report mailed Nov. 19, 2008", 2 pgs.
"U.S. Appl. No. 10/327,336, Non-Final Office Action mailed Jul. 2, 2004", 6 pgs.
"U.S. Appl. No. 10/327,336, Notice of Allowance mailed Aug. 31, 2004", 7 pgs.
"U.S. Appl. No. 10/327,336, Preliminary Amendment filed Feb. 17, 2004", 7 pgs.
"U.S. Appl. No. 10/327,336, Response filed Feb. 13, 2004 to Restriction Requirement mailed Jan. 16, 2004", 1 pg.
"U.S. Appl. No. 10/327,336, Response to Restriction Requirement and Preliminary Amendment filed May 5, 2004", 12 pgs.
"U.S. Appl. No. 10/327,336, Restriction Requirement mailed Jan. 16, 2004", 4 pgs.
"U.S. Appl. No. 11/557,179, Non-Final Office Action mailed Oct. 31, 2008", 6 pgs.
"U.S. Appl. No. 11/616,102, Notice of Allowance mailed Jan. 9, 2008", 6 pgs.
"U.S. Appl. No. 12/027,494, Final Office Action mailed Apr. 14, 2009", 5 pgs.
"U.S. Appl. No. 12/027,494, Notice of Allowance mailed Jul. 14, 2009", 4 Pgs.
"U.S. Apppl. No. 12/027,494, Response filed Jun. 15, 2009 to Final Office Action mailed Apr. 14, 2009", 8 pgs.
"U.S. Appl. No. 12/027,494, Non-Final Office Action Mailed Aug. 15, 2008", OARN, 5 Pgs.
"European Application Serial No. 03814101.6, mailed Mar. 13, 2008".
"International Application Serial No. PCT/US03/40205, International Search Report mailed May 4, 2004", 2 pgs.
"International Application Serial No. PCT/US03/40205, Preliminary Report on Patentability completed Apr. 11, 2005", 7 pgs.
"International Application Serial No. PCT/US2006/013244, International Search Report mailed Jul. 2, 2007", 1 pg.
"International Application Serial No. PCT/US2007/88139, International Search Report mailed May 1, 2008", 3 pgs.
"International Application Serial No. PCT/US2007/88139, International Written Opinion mailed May 1, 2008", 6 pgs.
"U.S. Appl. No. 12/027,494, Response filed Dec. 15, 2008 to Non Final Office Action mailed Aug. 15, 2008", 11 pgs.

* cited by examiner

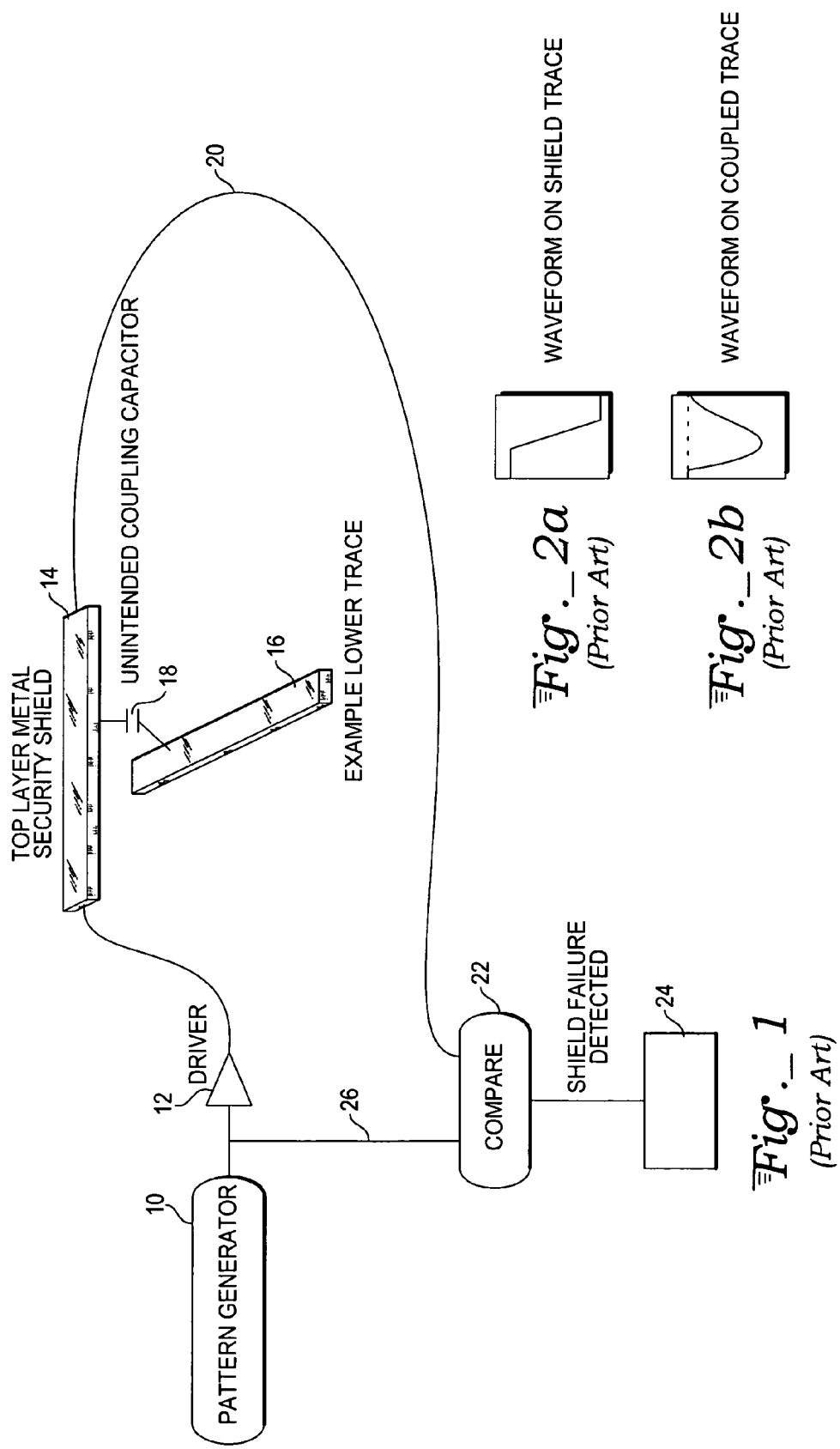

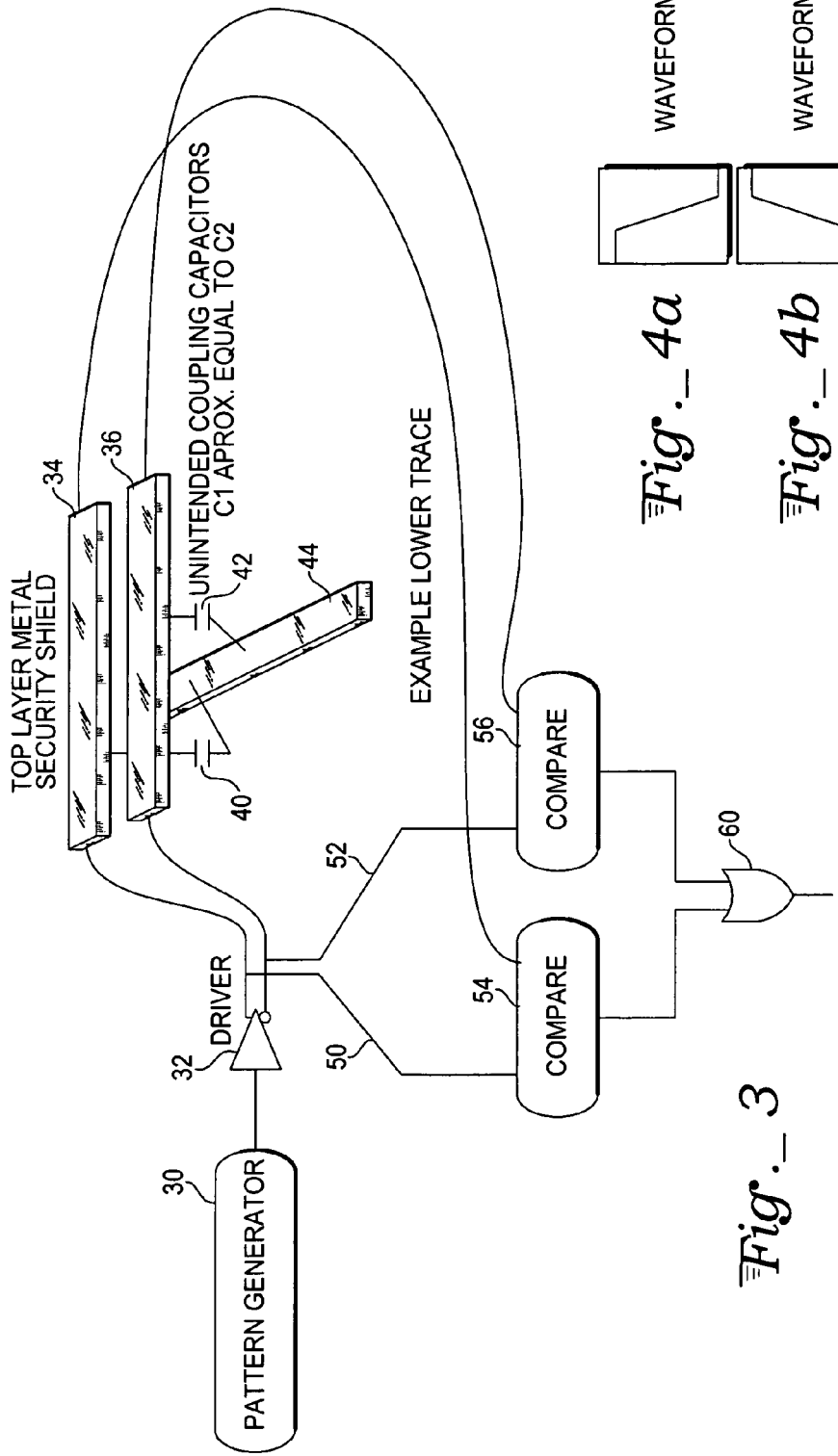
Fig. 3
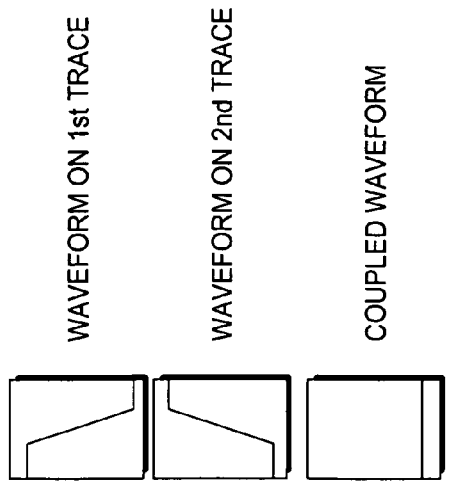
Fig. 4a — WAVEFORM ON 1st TRACE
Fig. 4b — WAVEFORM ON 2nd TRACE
Fig. 4c — COUPLED WAVEFORM

SECURITY METHOD FOR DATA PROTECTION

CROSS-REFERENCE TO RELATED APPLICATION

This application claims priority from U.S. provisional application No. 60/678,446, filed May 6, 2005.

TECHNICAL FIELD

The present device relates to data security devices and methods.

BACKGROUND

There presently is a need to provide security for data and software. For example, in bank terminals, data are entered using a touchpad or derived by a card reader (e.g., a magnetic card reader). These data are used to make a secure transaction. Security is necessary for such a transaction and access to the data must be protected.

To ensure that the data are not tampered with, stolen, or otherwise accessed without authorization the data are commonly encrypted prior to transmission. However data or software could still be accessed prior to encryption, as by accessing the traces of an integrated circuit (IC) through which the unencryted data are first sent. The traces could be accessed by either direct contact to the trace, or electronic surveillance, such as decoding voltage on a lead by measuring electromagnetic changes (e.g., induced magnetic fields, capacitance, etc.).

In prior devices a three dimensional mesh has been used to enclose an IC and prevent tampering. For example U.S. Pat. No. 6,646,565 to Fu, et al. and entitled, "Point of Sale (POS) Terminal Security System," discloses a device for security of electronic circuits in which an electrical connection is inserted between a first and a second circuit board. A tamper detection circuit is also used to detect circuit tampering. The entire device is wrapped in a mesh. Any tampering with the circuit boards or the mesh is sensed in a current flowing through a security layer in the circuit boards and mesh. This current disturbance signals a security system to scramble or erase sensitive data, such that the data will not be intercepted. Other similar devices include U.S. Pat. Nos. 4,593,384; 4,691,350; and 4,807,284.

U.S. Pat. No. 5,406,630, to Piosinka, et al., entitled, "Tamperproof Arrangement for an Integrated Circuit Device" discloses a tamper proof IC device. The package and lid include heavy metals to prevent both x-ray radiation and infrared detection of the functioning of the chip. This effectively provides an electrical shield of the workings of the IC U.S. Pat. No. 6,396,400, to Epstein III, et al., entitled, "Security System and Enclosure to Protect Data Contained Therein," discloses a security system for protecting a data storage device. The data storage device is enclosed in a first housing, which is mounted within a second housing by a number of support structures. A vacuum is created in an interstitial space between the first housing and the second housing. Breach of the second housing causes a pressure change that may be detected by a sensor.

In some security chips, a surface-level conducting trace layer is added which consists of one or more signal nets routed in such a way as to obscure the underlying circuitry. This top layer: 1. Visually hides the underlying circuit. An optical probe would not be able to image the circuit and from this image develop a means for accessing the circuit. 2. Prevents physical contact with the circuit; a physical probe would be prevented from contacting a conductive element in the underlying circuit and intercepting the signal that is present on that conductor. 3. Provides an electromagnetic shield. The conducting trace layer shields the underlying circuits from interference caused by electromagnetic signals. 4. Provides an electromagnetic masking signal. If a sensitive probe attempted to monitor an electromagnetic signal (including some indirect induced electromagnetic signal from the chip), the presence of an overlying source of electromagnetic signals would frustrate an attempt to intercept any underlying signal.

The shield may comprise an electrical shield component and a conductive component. The conductive component can be actively driven electrically in such a way that any disturbance to the component (e.g. drilling through the component, attempted modification to the conductive component, etc.) can be detected by a security circuit. The security circuit can then trigger a specific action, such as sounding an alarm, erasing data or software held by the circuit, etc.

An inherent feature of an active security trace is that when the voltage of the security trace layer changes it will induce a related change in any adjacent conductors through capacitance. The changing potential of the security trace will cause a current to flow in any adjacent trace via capacitive coupling. The current induced in an adjacent circuit is given by the equation $I = C\, dv/dt$, where "I" is a current induced, "C" is the value of capacitance between adjacent traces, and $dv/dt$ is the rate of change of the driving voltage.

With reference to FIG. 1, a pattern generator 10 generates a signal pattern sent to a driver 12. The driver 12 drives the generated signal pattern through a security trace 14. The security trace 14 is part of a security device on an integrated circuit (not shown). The security trace 14 may be embedded in the packaging of an integrated circuit or otherwise disposed in relation to a lower trace 16. The security trace 14 is connected to a compare circuit 22 by a trace conductor 20 or security trace 14 may be coupled directly to a compare circuit 22. The compare circuit 22 compares the signal generated by the pattern generator 10 as transmitted through a connection line 26 to the pattern received from security trace 14 via the trace conductor 20. FIG. 2A illustrates an example of a voltage change through time in the security trace 14. The lower trace 16 is underlying the security trace 14. As a result of capacitive coupling, discussed above, there is an unintended electrical coupling of the voltage change in the security trace 14 to the lower trace 16. The effect of the induced current on the voltage present at the lower trace 16 is shown in FIG. 2B. Ideally, the lower trace 16 would be unaffected by any voltage change in the security trace 14, however, due to the unintended coupling through the unintended coupling capacitor 18, there is a dip in the signal as charge carriers migrate to the unintended coupling capacitor 18 and the effect persists until the unintended coupling capacitor 18 is fully charged, at which time there is a recovery to the intended signal strength. Depending upon the function of the lower trace 16, this unintended signal coupling may result in corrupted data, instruction errors, etc. A skilled artisan will recognize that unintended coupling capacitor 18 is representative of parasitic capacitance and is not an actual component in the circuit.

A device that compensates for the unintended voltage coupling, thereby preventing any distortion of the signals in the underlying circuit would be useful.

BRIEF DESCRIPTION OF THE DRAWINGS

FIG. 1 is a schematic of a prior art security circuit.

FIG. 2A is a waveform graph of a voltage change on a prior art security trace.

FIG. 2B is a waveform graph illustrating the effect of the application of the voltage illustrated in waveform graph 2A to a single security trace on the voltage at a point in the underlying circuit.

FIG. 3 is a schematic of an embodiment of the present invention.

FIGS. 4A-4C are waveform graphs from each security trace in FIG. 3 and the combined traces.

SUMMARY

An integrated circuit security apparatus with substantially parallel security traces is presented. In an exemplary embodiment, the security apparatus comprises a pattern generator, which generates a first signal that is coupled to a first security trace and a second signal that is coupled to a second security trace. The pattern generator produces a voltage change in the second security trace that is substantially complementary to the voltage change in the first security trace. The timing and amplitude of the second (complementary) signal is developed such that the voltage change induced by the first trace is balanced as closely as possible by a complementary voltage change induced by the second trace; the net induced voltage change is substantially nil. The arrangement of the first and second security traces are such that the second trace is arranged substantially parallel to the first trace and is as close as is practicable. The first signal as coupled to a first end of the first security trace is compared to the first signal as it occurs at a second end of the first security trace. The comparison is used to indicate whether or not there has been any tampering with the integrated circuit. The second signal may also be monitored for indications of tampering.

DETAILED DESCRIPTION

In the following detailed description of the preferred embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that process or mechanical changes may be made without departing from the scope of the present invention.

With reference to FIG. 3, a pattern generator 30 generates a first signal that is sent to a driver circuit 32. The driver circuit 32 amplifies the first signal from the pattern generator 30 and generates a second signal, substantially complementary in phase and amplitude to the first signal. The driver circuit 32 supplies the first signal to a first end of a first security trace 34 and the second signal to a first end of a second security trace 36. The first and second signals are transmitted though first security trace 34 and second security trace 36, respectively, and are monitored by a first compare circuit 54 and a second compare circuit 56, respectively. The first compare circuit 54 and second compare circuit 56 are also coupled to the driver 32 by a first sampling conductor 50 and a second sampling conductor 52 respectively. This allows the compare circuits 54, 56 to compare the output from the driver 32, as received from the first and second sample conductors 50, 52, respectively, with signals received from a second end of the first and second security traces 34, 36, respectively. An output from the first and second compare circuits is then transmitted to a logic gate 60. The combination of resultant signal waveforms are illustrated in FIGS. 4A, 4B, and 4C, which respectively show a waveform from the first security trace 34, a complementary waveform from the second security trace 36, and a waveform that results in a trace capacitively coupled to both the first and second security traces, 34, 36.

In this embodiment, only two security traces are implemented. The geometric shapes used to create the trace pairs are designed in such a way that the two traces are as close as possible and oriented so that any significantly large signal adjacent to the traces (e.g. on a lower trace layer) has an equal capacitive coupling to both traces of the complementary pair. The result of this arrangement is a balance in the induced currents so that by using security signals that are substantially complementary in phase and amplitude, any induced currents are substantially canceled out.

It is possible to adjust an amplitude of the signal on the second trace, a phase relationship between the second and first signals, or both, in order to compensate for any circuit characteristics that affect capacitance, i.e., the dielectric constant (of the layers between the security traces 34, 36, and lower trace 44), the distance between the (virtual) unintended coupling capacitors 40, 42, and the size of the (virtual) unintended coupling capacitors' 42, 44 capacitive plates. A proper geometric arrangement can minimize any differences in coupling by maximizing the chances that both complementary security traces 34, 36, cross any underlying signals for an equal area. One such arrangement might be running the complementary shield traces in long parallel lines at a 45 degree angle to the underlying routing orientation, an alternative arrangement might be to vary the dimension of either of the conductive traces, which would allow for the localized control of the capacitive effect and thus the charge induced in the underlying circuit. This is one embodiment of the geometric arrangement that achieves the goal of balancing the induced currents.

One skilled in the art will recognize that the essential characteristic of using a security trace pairing arrangement is that the currents induced by the (virtual) unintentional coupling capacitors 40 and 42 to any lower trace 44 substantially cancel each other out. To this end, the range of voltages, trace sizes and trace geometries provide an unlimited number of combinations which can be utilized to achieve the desired cancellation. The skilled artisan will also recognize that lower trace 44 is representative, and that many such lower traces may be present in any given application. Therefore, the description contained herein should be viewed in an illustrative rather than restrictive sense.

What is claimed is:

1. An integrated circuit security apparatus comprising:
  a pattern generator, the pattern generator having a first signal output;
  a driver circuit configured to receive the first signal from the pattern generator and provide the first signal to a first end of a first security trace using a first output of the driver circuit, the driver circuit being further configured to:
    generate a second signal that is complimentary in phase and amplitude to the first signal, and
    provide the second signal to a first end of a second security trace using a second output of the driver circuit;
  the first security trace including a metal shield having a first end coupled to receive the first signal from the driver circuit, the first security trace being configured to transmit the first signal and output the transmitted first signal using a second end of the first security trace;

a first conductor coupled to the first output of the driver circuit and an input of a first comparator, the first conductor being configured to carry the first signal from the driver circuit to the first comparator;

the second security trace including a metal shield having a first end coupled to receive the second signal from the driver circuit, the second security trace being configured to transmit the second signal and output the transmitted second signal using a second end of the second security trace, the second security trace arranged parallel to the first security trace;

a second conductor coupled to the second output of the driver circuit and an input of a second comparator, the second conductor being configured to carry the second signal from the driver circuit to the second comparator, wherein the first conductor is separated from the second conductor;

the first comparator coupled to the first conductor and the second end of the first security trace and configured to compare the first signal output from the driver circuit and received at the first comparator using the first conductor with the transmitted first signal received from the second end of the first security trace; and the second comparator coupled to the second conductor and the second end of the second security trace and configured to compare the second signal output from the driver circuit and received at the second comparator using the second conductor with the transmitted second signal received from the second end of the second security trace.

2. The apparatus of claim 1, wherein the driver circuit is coupled between the pattern generator and the first and second security traces.

3. The apparatus of claim 1 wherein the first and second security traces are arranged so as to electromagnetically shield an architecture of an underlying integrate circuit.

4. The apparatus of claim 1, wherein the first and second security traces are arranged so as to visually obscure an architecture of an underlying integrated circuit.

5. The apparatus of claim 1 wherein the first and second security traces are arranged so as to obscure an electromagnetic radiation generated by an underlying integrated circuit.

6. The apparatus of claim 1 wherein the first and second security traces are geometrically configured to cancel induced voltages in an underlying circuitry.

7. The apparatus of claim 1, further comprising a logic device that is coupled to an output of the first comparator and to an output of the second comparator.

8. An integrated circuit comprising:
a driver circuit configured to provide a first signal at a first output of the driver circuit and a second signal at a second output of the driver circuit, where the second signal is complimentary in phase and amplitude to the first signal;

a first conductive trace including a metal shield having a first end and a second end, the first conductive trace configured to receive the first signal at the first end of the first conductive trace and provide the first signal at the second end of the first conductive trace;

a first conductor coupled to the first end of the first conductive trace and to an input of a first comparator, the first conductor being configured to carry the first signal from the first end of the first conductive trace to the first comparator;

a second conductive trace including a metal shield having a first end and a second end, the second conductive trace configured to receive the second signal at the first end of the second conductive trace and provide the second signal at the second end of the second conductive trace;

a second conductor coupled to the first end of the second conductive trace and to an input of a second comparator, the second conductor being configured to carry the second signal from the first end of the second conductive trace to the second comparator;

the first comparator configured to compare the first signal received from the first end of the first conductive trace via the first conductor with a first transmitted signal received from the second end of the first conductive trace, wherein the first transmitted signal is the first signal after the first signal is transmitted from the first end of the first conductive trace to the second end of the first conductive trace; and the second comparator configured to compare the second signal received from the first end of the second conductive trace via the second conductor with a second transmitted signal received from the second end of the second conductive trace, wherein the second transmitted signal is the second signal after the second signal is transmitted from the first end of the second conductive trace to the second end of the second conductive trace, and the second comparator is different from the first comparator.

9. The integrated circuit of claim 8, wherein the first conductive trace is arranged substantially parallel to the second conductive trace.

10. The integrated circuit of claim 8, further including a third conductive trace, wherein the first and second conductive traces are located in a first circuit level of the integrated circuit, and the third conductive trace is located in a second circuit level of the integrated circuit.

11. The integrated circuit of claim 8, wherein the second signal is a complement of the first signal.

12. The integrated circuit of claim 8, wherein the first and second signals are digital signals.

13. The integrated circuit of claim 8, wherein the first and second signals are analog signals.

14. An integrated circuit comprising:
a generator configured to generate a generated signal;
a driver circuit configured to generate a first signal based on the generated signal and a second signal that is complimentary in phase and amplitude to the first signal, the driver circuit having a first output for providing the first signal and a second output for providing the second signal;

a first conductive trace including a metal shield having a first end, a second end, and a conductive portion coupled to the first and second ends and extending continuously from the first end to the second end, the first end of the first conductive trace being coupled to the first output of the driver circuit for receiving the first signal, the first conductive trace being configured to transmit the first signal from the first end to the second end;

a first conductor coupled to the first output of the driver circuit and an input of a first comparator, the first conductor being configured to carry the first signal from the driver circuit to the first comparator;

a second conductive trace having a first end, a second end, and a conductive portion coupled to the first and second ends of the second conductive trace and extending continuously from the first end of the second conductive trace to the second end of the second conductive trace, the first end of the second conductive trace being coupled to the second output of the driver circuit for receiving the second signal, the second conductive trace being configured to transmit the second signal from the first end of the second conductive trace to the second end of the second conductive trace;

a second conductor coupled to the second end of the driver circuit and an input of a second comparator, the second conductor being configured to carry the second signal from the driver circuit to the second comparator;

the first comparator having a first input coupled to the first conductor and the first end of the first conductive trace, a second input coupled to the second end of the first conductive trace, and an output;

the second comparator having a first input coupled to the second conductor and the first end of the second conductive trace, a second input coupled to the second end of the second conductive trace, and an output, wherein the second comparator is different from the first comparator; and a logic device having a first input coupled to the output of the first comparator and a second input coupled to the output of the second comparator.

15. The integrated circuit of claim 14, wherein the driver circuit is configured to amplify the generated signal to produce the first and second signals.

16. The integrated circuit of claim 14, wherein a sum of the first and second signals is a nullity.

17. The integrated circuit of claim 14, wherein at least one of the first and second comparators is configured to provide a result indicating whether tampering of the integrated circuit has occurred.

18. The integrated circuit of claim 14, wherein the logic device is configured to perform a logical OR operation.

* * * * *

UNITED STATES PATENT AND TRADEMARK OFFICE
CERTIFICATE OF CORRECTION

| | |
|---|---|
| PATENT NO. | : 8,099,783 B2 |
| APPLICATION NO. | : 11/340975 |
| DATED | : January 17, 2012 |
| INVENTOR(S) | : Randall Wayne Melton |

It is certified that error appears in the above-identified patent and that said Letters Patent is hereby corrected as shown below:

Title Page, column 2 (Other Publications), line 1, please delete "Auhtor" and insert therefor --Author--;

Title page, column 2 (Abstract), lines 8-9, please delete "complimentary" and insert therefor --complementary--;

Title page, column 2 (Abstract), line 10, please delete "complimentary" and insert therefor --complementary--;

Page 2, column 2, line 33, please delete "Apppl." and insert therefor --Appl.--;

IN THE SPECIFICATIONS:

Column 1, line 28, please delete "unencryted" and insert therefor --unencrypted--;

Column 1, line 52, please delete "IC" and insert therefor --IC.--;

IN THE CLAIMS:

Column 4, claim 1, line 60, please delete "complimentary" and insert therefor --complementary--;

Column 5, claim 8, line 56, please delete "complimentary" and insert therefor --complementary--; and Column 6, claim 14, lines 45-46, please delete "complimentary" and insert therefor --complementary--.

Signed and Sealed this
Tenth Day of April, 2012

David J. Kappos
*Director of the United States Patent and Trademark Office*